G. H. STALLMAN.
PISTON.
APPLICATION FILED DEC. 11, 1911.
1,031,739.
Patented July 9, 1912.
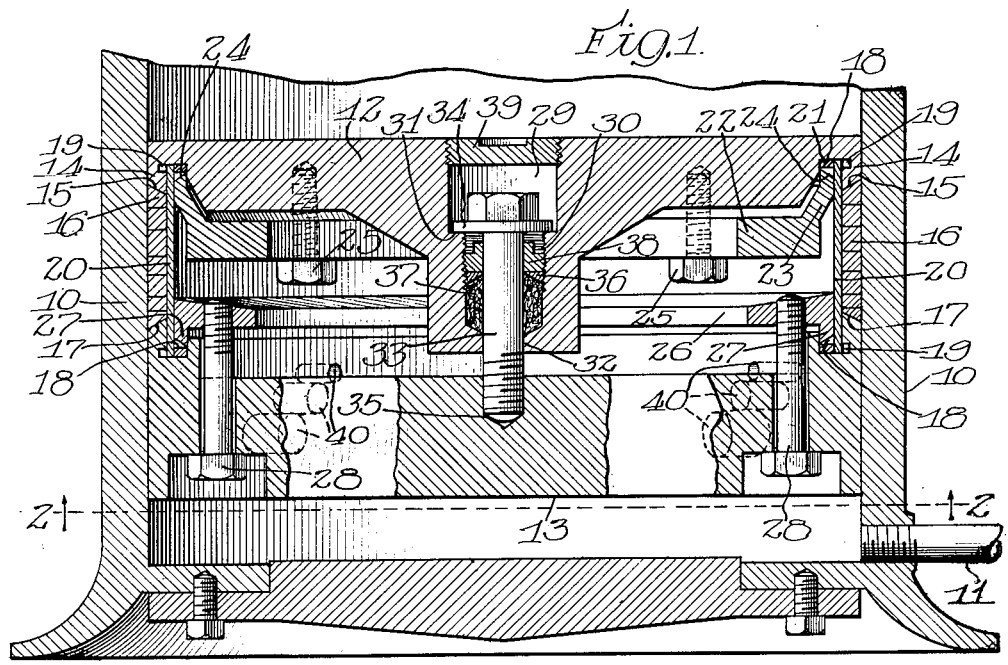
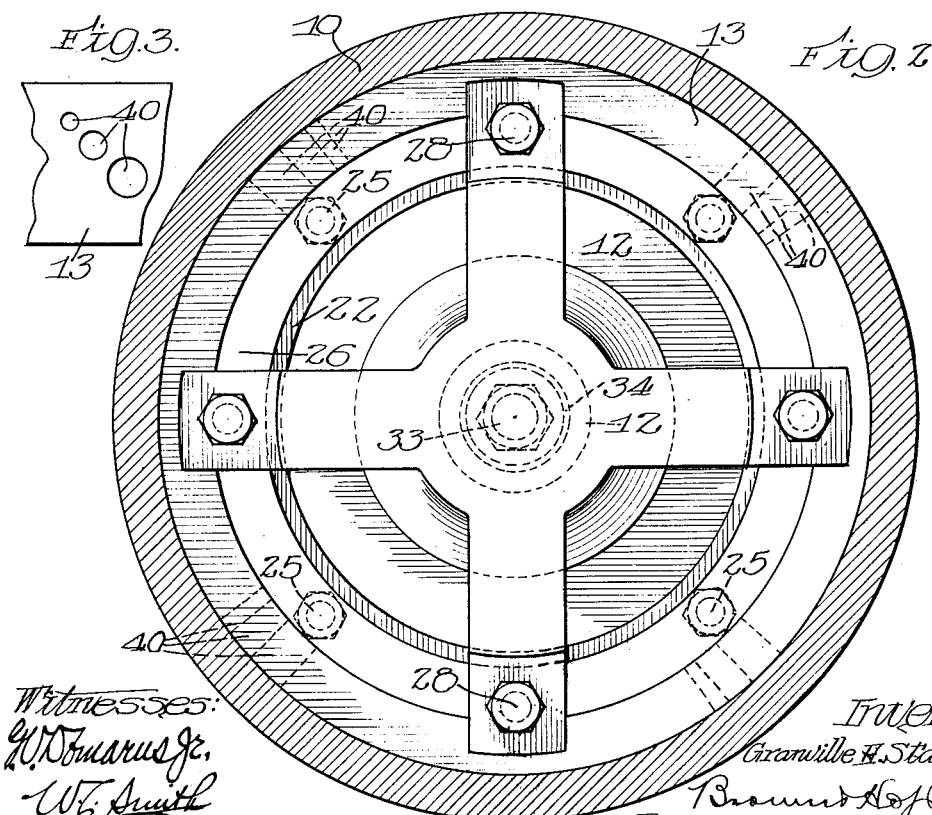
Witnesses:
Inventor: Granville H. Stallman

UNITED STATES PATENT OFFICE.

GRANVILLE H. STALLMAN, OF CHICAGO, ILLINOIS.

PISTON.

1,031,739.   Specification of Letters Patent.   Patented July 9, 1912.

Application filed December 11, 1911. Serial No. 664,985.

*To all whom it may concern:*

Be it known that I, GRANVILLE H. STALLMAN, a citizen of the United States, residing at Chicago, in the county of Cook and State of Illinois, have invented certain new and useful Improvements in Pistons, of which the following is a specification.

This invention relates to improvements in single-acting fluid-actuated pistons or press-heads of the rodless type, particularly adapted, though not necessarily limited in its use, to compacting plastic material, such as sausage and the like, and to expel the same from an inclosure through an outlet opening; and one of the objects of the invention is to provide an improved piston of this class having packing upon which the pressure fluid directly acts to automatically adjust the same to form a fluid-tight joint to prevent the escape of fluid, while at the same time the packing will be capable of contracting or assuming a position, when the pressure is relieved, to permit the piston or press-head to fall or return freely in the cylinder without the application of power thereto.

A further object of the invention is to provide an improved piston of this class having means to permit the escape of the pressure fluid at different points in the stroke of the piston.

For the attainment of these ends and the accomplishment of other new and useful objects, as will appear, the invention consists in the features of novelty in the construction, combination and arrangement of the several parts generally shown in the accompanying drawing and described in the specification, but more particularly pointed out in the appended claims.

In the drawing, Figure 1 is a sectional elevation of a cylinder having a piston therein constructed in accordance with the principles of this invention. Fig. 2 is a sectional plan view taken on the line 2—2 of Fig. 1 and looking in the direction of the arrows. Fig. 3 is a detail view of graduated openings in one of the piston members.

The present application is a substitute application covering substantially the same subject-matter as presented in the applicant's application for patent for a piston, filed in the United States Patent Office on or about October 27, 1911, having Serial No. 657,154.

Referring more particularly to the drawing and in the present exemplification of the invention the reference numeral 10 designates generally an inclosure in the form of a cylinder within which the piston operates, and into which cylinder the actuating fluid is admitted adjacent the base thereof through an inlet pipe 11.

The piston is of sectional structure and embodies spaced members 12 and 13, arranged one above the other and of a diameter and configuration to substantially fill the cylinder. The member 12 constitutes the head of the piston and is preferably reduced in thickness adjacent its periphery and shaped to form a circumferential flange 14 projecting away from the operating face of the head, and this flange is provided with an inclined face 15 along the edge thereof, against which face the packing 16 bears. This packing 16 is of annular construction and is arranged between the members 12 and 13 with one edge bearing against the inclined face 17 of the member 13, and serves to support the member 12 and to space the two members apart. The members 12 and 13 are each provided with a circumferential recess 18 adjacent their circumferences which open in a direction toward each other, and these grooves or recesses 18 are enlarged laterally as at 19 adjacent the base of the recess and toward the periphery of the members 12 and 13. An annular packing ring 20, which is constructed of any suitable elastic material such as leather, rubber or the like, is arranged within the packing 16 and abutting the inner face thereof. The extremities of the packing 20 project into the recesses 18 in the members 12 and 13 and terminate adjacent the enlarged portion 19 of the recess, whereby the members 12 and 13 are spaced apart.

In order to hold the packing 20 against displacement, and in order to form a fluid-tight joint between one end of the packing 20 and the section 12 of the piston, an elastic packing ring 21 is provided, which is seated in the recess 18 adjacent the extremity of the packing 20 and in proximity to the enlarged portion 19 of the recess, so that when the packing ring 20 is compressed a portion thereof will be forced into the portion 19 of the recesses 18. Any suitable means may be employed for compressing the packing 21, and for this purpose a compression ring 22 is provided, which has an extending rim 23 of a configuration to conform to the configuration of the adjacent face of the section of the member 12, the rim portion being formed with an inclined face 24, which is adapted to bear against the packing 21 the recess 18. This packing ring 22 is provided with any suitable means for compressing the packing material 21 by means of the movement of the ring, such for example, as the bolts 25, which are threaded into the member 12 and which force the rim of the said packing ring to compress the packing 21. The other end of the packing 20 is compressed in a similar manner by means of a packing ring 26 having an extending rim 27 with an inclined face which bears against the packing 21 in the recess 18 of the member 13. The packing ring 26 is operatively moved and is held in position in any suitable manner, such for example, as by means of the bolts 28 which extend through the member 13 from the under side thereof and are threaded into the ring 26 to secure it in position.

The members 12 and 13 are properly spaced apart by the packing 16 and 20, and are held in their spaced position in any suitable manner. The preferred method of connection between the members, however, is shown in Fig. 1, in which the member 12 is provided with an opening 29 extending from the head portion of the member toward the other member 13. This chamber 29 is formed with a reduced portion 30, thereby providing a shoulder 31, and at the bottom of the opening 30 is an aperture 32 to permit a bolt 33 to be inserted therethrough. A washer 34 is provided which abuts the shoulder 31, and the threaded portion of the bolt extending through the aperture 32 is threaded into a suitable thread hole 35 in the hub of the member 13. In order to provide a suitable packing around the bolt 33 the lower end of the opening 30 is provided with inclined faces and a wedge-shaped clamping ring 36 is inserted in the opening, between which and the lower inclined faces packing material 37 is inserted. A clamping nut 38 formed with hexagonal head of reduced size is threaded into the opening 30, and bears against the ring 36 to compress the packing material 37 about the bolt 33. The upper edge of the opening 29 is preferably threaded to receive a cap plate 39, which prevents the material contained in the cylinder from clogging the opening 29, and permits ready access to the head of the bolt 33, whereby it may be adjusted to properly position the members 12 and 13 with respect to each other.

In order to insure a tight fit of the packing 16 against the wall of the cylinder, which will be sufficient to prevent leakage about the cylinder, and in order to render the degree of pressure of the packing against the wall of the cylinder variable, so as to allow the piston to drop or return to its normal position freely, the member 13 of the piston is preferably in the form of a spider to permit the fluid to pass readily throughout from beneath and into contact with the packing 20. When this fluid pressure is exerted upon the packing 20 it, as well as the packing 16 being elastic will force the latter tightly against the wall of the cylinder, while at the same time the pressure of the fluid will be exerted against the member 12 to raise the piston.

To permit the fluid under pressure to escape from the cylinder as the piston reaches the limit, or any predetermined point in its operative movement and to obviate the danger of the piston being blown out of or against the head of the cylinder by the pressure of the fluid, and to permit the piston to readily return when the supply of fluid through the pipe is cut off, or the pressure becomes reduced, the member 13 is provided with longitudinal openings 40, which extend through the wall thereof at suitable points and are preferably graduated and so arranged that they will be opened at different points of the stroke of the piston. This is accomplished by arranging the openings 40 longitudinally of the piston and in such positions that the smaller openings will pass above the top of the cylinder or will open to the atmosphere in advance of the others, and will thereby gradually reduce the pressure behind the piston by permitting the fluid to escape. When the pressure is thus relieved, the pressure upon the packing 16 and 20 is also relieved, and the piston will drop to assume a position in accordance with the pressure remaining, or will assume the normal position, the packing 16 and 20 being permitted to contract slightly so as not to interfere with the return of the piston.

The primary object of the openings 40 is to prevent the piston from being forced out of the cylinder and to provide for the release of pressure when the piston reaches a predetermined point. The graduated openings are for the purpose of allowing for a variation of pressure and volume of the fluid under pressure. If the smaller openings do not present sufficient outlet openings, the piston will rise still higher to uncover the other ports and more of the fluid under pressure will be allowed to escape. As soon as the pressure under the piston is reduced, it will fall back within the cylinder, and if the pressure is maintained at a constant value by the escape of fluid from the horizontal openings 40, the piston will assume and be maintained in a stationary position.

The surfaces 15 and 17 are inclined inwardly toward each other, the purpose thereof being to direct the packing 16 outwardly when the members 12 and 13 are compressed or drawn together by the bolt 33. A slight compression of the packing 16 occurs when the piston is under pressure by reason of the fact that the member 13 is not exactly balanced, due to the difference in area above and below the member 13, the top area being less by an amount of equal to the cross-sectional area of the packing 16. Under normal working conditions this difference is only sufficient to produce a slight compression of the packing 16 between the faces 15 and 17 which results in the application of the packing to the wall of the cylinder, due to the inclination of the said faces.

The threaded portion of the opening 29 in the member 12 may be utilized for the insertion of a tool or device by means of which the piston may be lifted out of the cylinder 10 when desired. It is also evident that the construction of the member 13 is such as to permit ready access to the bolts 25 by means of which the clamping ring 22 may be adjusted, and the bolts 28 are readily accessible from the bottom of the piston to adjust the position of the clamping ring 26. The bolts 25 are preferably disposed so that they are between the bolts 28, and are therefore between the ribs of the spider where they may be easily adjusted from the bottom of the piston without separating the piston members.

With this improved construction it is manifest that the packing 20 and 16 are directly acted upon by the fluid which operates the piston, the pressure of which fluid controls the degree of engagement of the packing with the wall of the cylinder, thereby dispensing with any mechanical means for expanding the packing. Furthermore, the larger portion of the inner face of the packing 20 is free from any support or contact with any other supporting element, whereby the fluid may freely act directly thereupon, with the further result that the packing will freely expand to form a tight joint when the pressure is exerted upon the piston and will contract when said pressure is removed to prevent undue friction of the packing with the walls of the cylinder, which friction would seriously interfere with the free return of the piston.

What I claim as new is:

1. In a piston the combination of two members connected together with a space therebetween and relatively movable, and an expansible packing between the members forming a surrounding wall for the space with its inner face freely exposed to the space and means for preventing said members from moving apart beyond a fixed distance, said space having communication with the cylinder on the pressure side of the piston.

2. In a piston, the combination of two members connected together with a space therebetween, an expansible packing between the edges of the members and being freely exposed on one side of the said space, said space having an opening leading through the member on the pressure side of the piston, and an intermediate member for securing one edge of the packing to the piston member.

3. The combination of a cylinder, a piston movable therein and operable by fluid pressure, an expansible packing between the members and extending across the space with its inner face freely exposed to the space, there being one or more passages through the member on the pressure side of the piston communicating with said space whereby the pressure fluid will act directly upon the packing to force the same outwardly, an intermediate member and means with which said intermediate member coöperates to secure the packing to one of the piston members.

4. A piston embodying two spaced members connected together and provided in their adjacent faces with opposed recesses, elastic packing extending across the space between the members and with its edges extending into the recesses, an elastic member seated in one of the recesses and abutting the adjacent portion of the packing, and means for expanding the said elastic member for securing the packing to one of the piston members.

5. A piston embodying two spaced members connected together and provided in their adjacent faces with opposed recesses, an elastic packing extending across the space between the members and with its edges extending into the recess, an elastic member seated in one of the recesses and abutting the adjacent portion of the packing, and means for expanding the said elastic member for securing the packing to one of the piston members, the other member being provided with one or more passages therethrough communicating with the said space.

6. A piston embodying two spaced members connected together and provided in their adjacent faces with opposed recesses, elastic packing extending across the space between the members and with its edges extending into the recesses, an elastic member seated in one of the recesses and abutting the adjacent portion of the packing, an intermediate member disposed between the first two members and having a portion projecting into the recess to engage the elastic member, and means for forcing the intermediate member toward the piston member to compress said elastic member.

7. A piston embodying two spaced members connected together and provided in their adjacent faces with opposed recesses, elastic packing extending across the space between the members and with its edges extending into the recesses, an elastic member seated in one of the recesses and abutting the adjacent portion of the packing, an intermediate member disposed between the first two members and having a portion projecting into the recess to engage the elastic member, and means for forcing the intermediate member toward the piston member to compress said elastic member, the said recess in which the elastic member is located being provided with another recess into which a portion of the packing is forced by the elastic member.

8. A piston embodying two members spaced from each other, elastic packing between the members extending across the space, one of the members having an opening therethrough communicating with the space, the other member having a recess into which the edge of the packing projects, said recess having an offset portion, an elastic member in the recess and abutting the packing, an intermediate member projecting into the recess, means connecting the members, and means for adjusting the intermediate member to compress the elastic member to force a portion of the packing into the said offset portion of the recess.

9. A piston embodying two members connected together to form a space therebetween and provided in adjacent faces with opposed recesses, elastic packing extending across the space and freely exposed to the space, the edges of the packing projecting into the recesses, an elastic member in one of the recesses abutting the adjacent portion of the packing, an intermediate member projecting into the recess, and means for adjusting the intermediate member to compress the elastic member.

10. The combination of a cylinder, a fluid actuated piston embodying two members connected together to form a space therebetween and having exposed recesses in their adjacent faces, elastic packing extending across the space and having its edges seated in the recesses, an elastic member in one of the recesses abutting the adjacent portion of the packing, and an intermediate member connected with one of the piston members and having a portion projecting into the recess, means for adjusting the intermediate member to compress the elastic member.

11. A piston comprising two spaced members connected together and provided in their adjacent faces with opposed recesses, elastic packing extending across the space between the members and with its edges extending into the recesses, an elastic member seated in each of the recesses and abutting the adjacent portion of the packing, packing rings disposed between the first two members and each having a rim portion extending into one of the recesses to engage the elastic member, and means for forcing the packing rings toward their respective piston members to compress the said elastic member.

12. A piston comprising two spaced members connected together and provided in their adjacent faces with opposed recesses, one of said members being of spider construction, elastic packing extending across the space between the members and with its edges extending into the recesses, an elastic member seated in each of the recesses and abutting the adjacent portion of the packing, packing rings disposed between the first two members each having rim portions extending into one of the recesses to engage the elastic member, and means adjustably to secure each of the packing rings to their respective piston member, the fastening means for one ring being disposed between the ribs of the member of spider construction to permit easy access thereto.

13. A piston comprising two spaced members connected together and provided in their adjacent faces with opposed recesses, one of said members being of spider construction, elastic packing extending across the space between the members and with its edges extending into the recesses, an elastic member seated in each of the recesses and abutting the adjacent portion of the packing, packing rings disposed between the first two members each having rim portions extending into one of the recesses to engage the elastic member, and means adjustably to secure each of the packing rings to their respective piston member, the fastening means for the lower ring extending through the lower piston member, and the fastening means for the upper ring being threaded into the upper member from below and disposed between the ribs of the lower member.

14. The combination with a cylinder, of a fluid actuated piston for receiving pressure on one side thereof and embodying two members spaced apart, means connecting said members and preventing their separation more than a predetermined amount and permitting their approximation, elastic packing disposed between the members and freely exposed to the space, said space also having a free opening through one of the members to the pressure side of the piston, and the last named member being provided with openings arranged to permit an escapement of the pressure fluid at different points during the stroke of the piston.

15. The combination with a cylinder, of a fluid actuated piston for receiving pressure on one side thereof and embodying two members spaced apart, means connecting said members and preventing their separation more than a predetermined amount and permitting their approximation, elastic packing disposed between the members and freely exposed to the space, said space also having a free opening through one of the members to the pressure side of the piston, and the last named member being formed with graduated openings through the periphery thereof arranged at different points along the member to vary the escapement of pressure as the piston is moved in the cylinder.

16. In a device of the class described, the combination with a cylinder, of a fluid actuated piston for receiving pressure on one side thereof and embodying two members spaced apart, means connecting said members and preventing their separation more than a predetermined amount and permitting their approximation, elastic packing disposed between the members and freely exposed to the space, said space also having a free opening through one of the members to the pressure side of the piston, and the last named member being provided with openings in the periphery communicating with the interior space, the said openings being arranged along the member to form a graduated escapement for fluid pressure from the pressure side of the piston when it reaches the top of the cylinder.

17. In a sausage stuffing machine, the combination with a cylinder of a rodless piston head movable therein and comprising two members spaced apart, elastic packing disposed between the members at their peripheries and freely exposed to pressure through one of said members, perforations being provided through the sides of the last named member arranged along the member and graduated in size to provide a graduated escapement for fluid pressure from the cylinder.

18. In a sausage stuffing machine, the combination of a cylinder open at one end, and a rodless piston movable therein, comprising members spaced apart, elastic packing disposed between the members, one of them being apertured at the center and having perforations therefrom through the periphery, the said perforations being graduated in size and arranged along the axis of the member, so that there is a graduated escapement of pressure from the cylinder as the piston is moved outwardly at the top of the cylinder.

19. In a sausage stuffing machine, the combination of a cylinder open at one end, and a rodless piston movable therein, comprising members spaced apart, elastic packing disposed between the members, one of them being apertured at the center and having perforations therefrom through the periphery, the said perforations being graduated in size and arranged along the axis of the member with the smallest openings nearest the open end of the cylinder to provide for a gradually increasing escapement of fluid pressure from the cylinder as the piston is moved outwardly.

20. A rodless piston head for a sausage stuffing machine, comprising two members spaced apart, one of them being of spider formation with a perforated rim, elastic packing disposed between the members at their edges and freely exposed on the inside thereof, and means to connect the members to prevent their separation and permit their approximation, the said perforations being graduated in size and arranged along the said member in an axial direction.

In testimony whereof I have signed my name to this specification, in the presence of two subscribing witnesses, on this 9th day of December, A. D. 1911.

GRANVILLE H. STALLMAN.

Witnesses:
CHARLES H. SEEM,
K. W. WONNELL.